United States Patent
Odaohhara et al.

(10) Patent No.: US 6,839,853 B2
(45) Date of Patent: Jan. 4, 2005

(54) SYSTEM FOR CONTROLLING POWER OF COMPUTER DEPENDING ON TEST RESULT OF A POWER-ON SELF TEST

(75) Inventors: Shigefumi Odaohhara, Kanagawa-ken (JP); Arimasa Naitoh, Kanagawa-ken (JP); Ken Inoue, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 09/760,115

(22) Filed: Jan. 12, 2001

(65) Prior Publication Data

US 2002/0052706 A1 May 2, 2002

(30) Foreign Application Priority Data

Jan. 17, 2000 (JP) .................................... 2000-007825

(51) Int. Cl.[7] .................................................. G06F 1/26
(52) U.S. Cl. ............................. 713/300; 713/2; 714/25; 714/48
(58) Field of Search ................................ 713/1, 2, 300, 713/310, 340, 100; 714/25, 47, 48, 704, 30; 702/57–59

(56) References Cited

U.S. PATENT DOCUMENTS

| | | | | |
|---|---|---|---|---|
| 5,564,054 A | * | 10/1996 | Bramnick et al. | 713/2 |
| 5,974,576 A | * | 10/1999 | Zhu | 714/704 |
| 5,978,913 A | * | 11/1999 | Broyles et al. | 713/2 |
| 6,058,501 A | * | 5/2000 | Urazoe et al. | 714/795 |
| 6,502,208 B1 | * | 12/2002 | McLaughlin et al. | 714/25 |
| 6,560,725 B1 | * | 5/2003 | Longwell et al. | 714/54 |

FOREIGN PATENT DOCUMENTS

| | | | | |
|---|---|---|---|---|
| JP | PUPA-51-37855 | 10/1976 | | |
| JP | PUPA 4-131919 | 5/1992 | | |
| JP | PUPA 6-242978 | 9/1994 | | |
| JP | 6-242978 | 9/1994 | ............ | G06F/11/14 |
| JP | 9-160796 | 6/1997 | ............ | G06F/11/22 |
| KR | 1998-17672 | 6/1998 | ............ | G06F/11/26 |

\* cited by examiner

*Primary Examiner*—Lynne H. Browne
*Assistant Examiner*—Thuan Du
(74) *Attorney, Agent, or Firm*—Lawrence D. Cutter, Esq.; Kevin P. Radigan, Esq.; Heslin Rothenberg Farley & Mesiti P.C.

(57) ABSTRACT

To obtain a method for controlling power of a computer, a power control apparatus, and the computer which can prevent a user from feeling uneasy unnecessarily and inhibit a power-on problem from arising again. When the power switch is depressed, the power-on self test (POST) starts and if there is no error detected by that test in connection with the initialization of the IC, the operating system OS is loaded to make the computer operative (steps 200 through 208). If there is any error detected, a determination is made whether that error occurs as frequently as or more frequently than a predetermined number of times. If that error occurs as frequently as or more frequently than the predetermined number of times, an error indication is displayed and then the process ends. If that error occurs less frequently than the predetermined number of times, the error history is stored and then a setup for stabling the hardware operation is selected. Then, a restart signal to restart the computer is sent and the process ends (steps 210 through 220).

10 Claims, 6 Drawing Sheets

SYSTEM FOR CONTROLLING POWER OF COMPUTER DEPENDING ON TEST RESULT OF A POWER-ON SELF TEST

PRIOR FOREIGN APPLICATION

This application claims priority from Japanese patent application number 2000-007825, filed Jan. 17, 2000, which is hereby incorporated herein by reference in its entirety.

FIELD OF THE INVENTION

The present invention relates to a method for controlling power of a computer, a power control apparatus, and the computer, and more particularly, to a method for controlling power of a computer in which at least a power-on self test for hardware is carried out before shifting into an operating system process, when the power is turned on, a power control apparatus performing such a method, and the computer having such a power control apparatus.

BACKGROUND ART

During the startup operation, a personal computer (PC) generally performs an operational test for memory provided in the PC (write/read test), and a series of self tests to check that the basic operations are performed properly, for example, to check whether the current system configuration coincides with the configuration specified by the device configuration utility. The above-mentioned self test is hereinafter referred to as "POST" (Power-On Self Test).

Hardware such as PCs may encounter some problem when it is turned on, since any component has a fraction defective more than 0 (zero) even if it has been designed prudentially. By way of example, it may be a typical one that an IC (Integrated Circuit) such as an LSI (Large Scale Integration) or ASIC (Application Specific Integrated Circuit) is not initialized properly when it is turned on. Such a problem may result from environmental conditions such as temperature and humidity, rather than a higher fraction defective of that component as described above.

Such a power-on problem may frequently be detected through the POST described above and if it has been detected through the POST, the system indicates on the display an error code corresponding to the detected problem and problematic conditions and then stops the startup operation. Then, the user would turn off the system and then turn it on again to restart it with some anxiety.

However, when the user restarts the system as described above, the user would continue to operate it, feeling uneasy, even if no problem may arise during such a restart operation.

In other words, such a power-on problem as described above may not arise again during the restart operation. In this case, the PC can operate with no trouble but the user will still feel uneasy because it is not clear why the initial power-on problem does not arise again during the restart operation.

In addition, when the user restarts the system as described above, the same problem may frequently arise again because the system is restarted substantially under the same conditions as those for the initial power-on operation.

SUMMARY OF THE INVENTION

The present invention is devised to overcome these problems and therefore, it is an object of the present invention to attain a method for controlling power of a computer, a power control apparatus, and the computer which can prevent the user from feeling uneasy unnecessarily and inhibit such a power-on problem from arising again.

In a method for controlling power of a computer and a power control apparatus according to the present invention, when a predetermined test result is provided by a self test to be carried out before an operating system process of the computer, the power supply to the computer is stopped and then the power is turned on again. This will allow the computer to restart and if such a predetermined test result is not provided during the restart operation, the computer will restart normally. The user will not be aware of the occurrence of a problem detected through the self test, which can prevent the user from feeling uneasy unnecessarily.

The computer contains many components such as integrated circuits having a variety of functions and some of these components are configured to operate normally only when they are reset (initialized) properly by a reset signal during the power-on operation. However, some component may not be reset properly because of external noise or excessively increased ambient temperature and then, that component may be reset properly by applying a reset signal to it again.

In order to allow for such situations, it is preferable that the predetermined test result includes a test result indicating that any hardware component contained in the computer is not initialized correctly. This will allow the computer to restart when any problem arises in initializing such a component, without making the user aware of it.

In the method for controlling power of a computer and the power control apparatus according to the present invention, if the computer is simply restarted, the same problem may be quite likely to arise again because the computer will be restarted substantially under the same conditions as those for the initial power-on operation. A power-on problem may frequently result from unstable operations of hardware. Therefore, in the method for controlling power of a computer and the power control apparatus according to the present invention, it is preferable that the operation of any hardware component contained in the computer can be stabilized when the predetermined test result described above has been read out. This may make the hardware operation stabler than that for the initial power-on operation when the computer is turned on again, thereby inhibiting the power-on problem from occurring again.

In order to stabilize the hardware operation as described above, it is preferable that at least one selected from the group consisting of a setup for stabilizing the operation of a power circuit in the computer, a setup for cooling the inside of the computer, and a setup for disabling a function to suppress power consumption is carried out.

For example, if a switching power circuit is used as the power circuit in the computer, it may be configured to selectively use one of the two types of PWM (Pulse Width Modulation), one using a switching signal (pulse signal) which varies the frequency according to the load current and the other using a switching signal which varies the pulse width (duty) at a fixed frequency independently of the magnitude of the load current, in order to control to turn on/off a switching element contained in the power circuit.

It should be appreciated that the PWM type using a switching signal which varies the frequency can provide a higher conversion efficiency and lower stability because of higher level noise than the other PWM type using a switching signal at a fixed frequency. Therefore, the operation of the power circuit in the computer can be stabilized by specifying the latter PWM type using a switching signal at a fixed frequency for the power circuit.

A PC typically has a fan provided therein to prevent any excessively increased internal temperature or CPU temperature. A setup for forcing this fan to rotate may be taken as an example of the setup for cooling the inside of the computer as described above.

In addition, a PC, particularly, a portable PC such as a notebook PC, a subnotebook PC, a palmtop PC, or a PDA (Personal Data Assistants) is generally provided with a power management function which manages the power usage to minimize power consumption. This power management function uses, for example, a CPU operating ratio of approximately 50% with the peripherals turned off but the hardware operation will be unstable under these conditions. That is, for example, if the CPU operating ratio is reduced to approximately 50% while the CPU is receiving from or sending to other devices a certain amount of data, some of the data may be lost. Therefore, the hardware operation can be stabilized by disabling the power management function.

In the method for controlling power of a computer and the power control apparatus according to the present invention, certain problem cannot be solved even if the computer is turned on again after stopping the power supply to it. In this case, there may arise a new problem that the restart operation is repeated and the computer will never eventually start up.

Therefore, with the method for controlling power of a computer and the power control apparatus according to the present invention, it is preferable that the power is inhibited to be turned on again after the power supply to the computer is stopped when the predetermined test result has been read out at a predetermined number of times. This may avoid the above-mentioned problem that the restart operation is repeated and the computer will never eventually start up.

For this purpose, it is preferable that an indication is given on the display for the computer or a sound alarm provided for the computer is issued to indicate that the identical problem arises at a predetermined number of times. This may allow the user to be aware that such a problem arises that cannot be avoided by the restart operation.

The computer according to the present invention has a power unit controlled by the power control apparatus according to the present invention and the computer load can operate on the power supplied by the power unit.

Therefore, with the present computer, when the self test provides a predetermined test result, the power supply to the computer is stopped and then the computer is turned on again for restart. Thus, the computer will start up normally if such a predetermined test result is not provided during the restart operation, thereby preventing the user from being aware of the occurrence of any problem detected through the self test and from feeling uneasy unnecessarily.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF SYMBOLS

Figure 1:
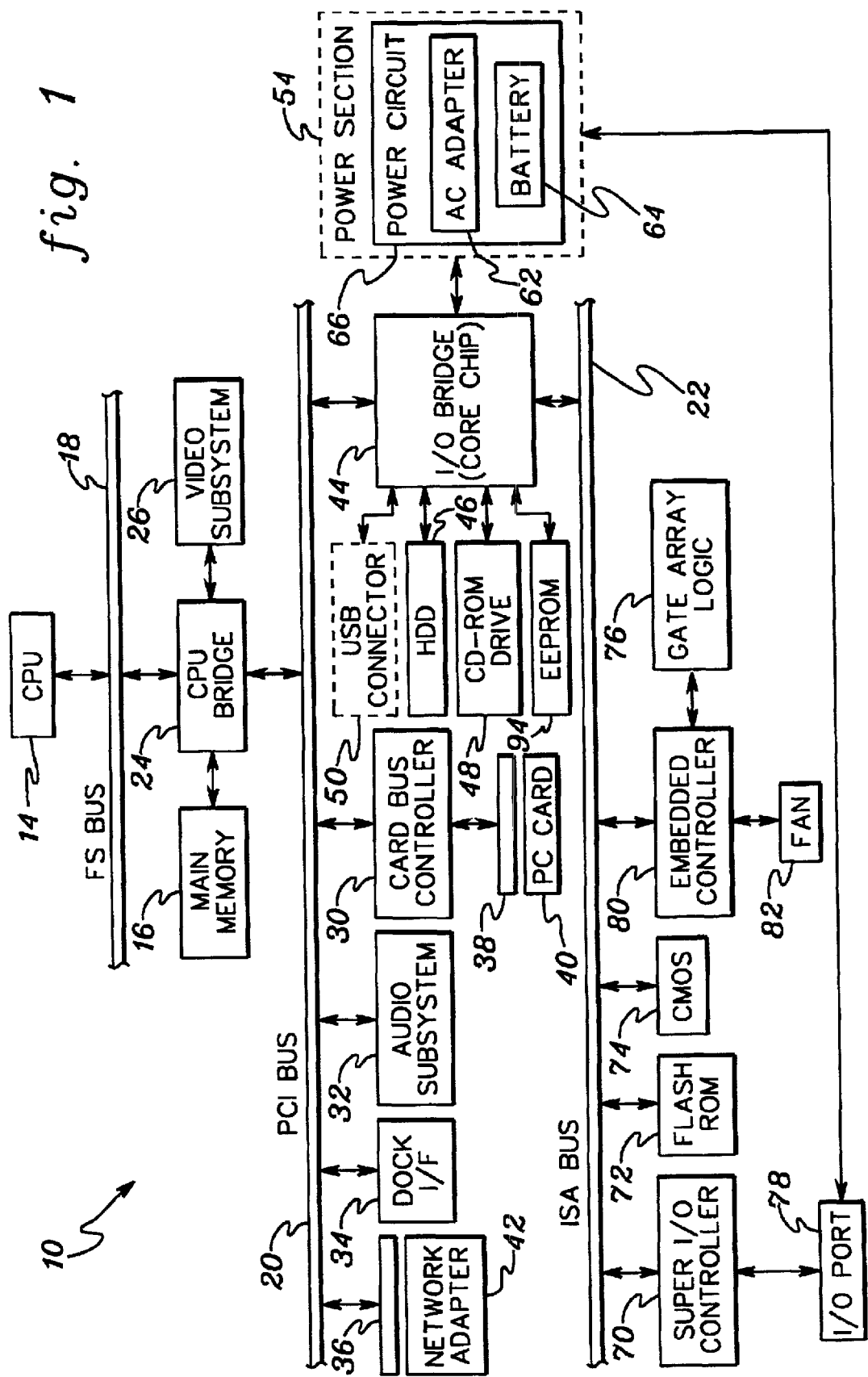
FIG. 1 is a block diagram for schematically showing the configuration of a computer system according to an embodiment of the present invention.

10 . . . Computer system (computer)
54 . . . Power section
62 . . . AC adapter
64 . . . Battery
66 . . . Power circuit (power control apparatus)
76 . . . Gate array logic
78 . . . I/O port
80 . . . Embedded controller
82 . . . Fan
100 . . . Subregulator
102 . . . Power-on switch circuit
104 . . . Power-on circuit
106 . . . Power-off circuit
108 . . . Auto power-off circuit
110 . . . Auto power-on circuit
112 . . . Main regulator
114 . . . Level shift circuit
116 . . . Error condition holding circuit
118 . . . Power-on circuit (control means)
DC2 . . . DC-DC converter (power unit)

BEST MODE FOR CARRYING OUT THE INVENTION

Now, an embodiment of the present invention will be described below in detail with reference to the drawings. FIG. 1 schematically shows the hardware subsystem configuration of a computer system 10 consisting of a typical personal computer (PC) suitable for implementing the present invention. An example of PC for implementing the present invention includes a notebook PC 12 (see FIG. 2) conformable to the OADG (PC Open Architecture Developer's Group) specification and running an operating system (OS) such as "Windows 98" or "Windows NT" available from Microsoft Corporation (USA) or "OS/2" available from International Business Machines Corporation (IBM) (USA). Now, the computer system 10 will be further described below.

A CPU 14 which acts as the brain for the overall computer system 10 executes various programs under control of the OS. The CPU 14 may be a CPU chip called "Pentium," "MMX technology Pentium," or "Pentium Pro" manufactured by Intel Corporation (USA), or may be a CPU manufactured by any other company such as AMD, or may be a "PowerPC" manufactured by IBM. The CPU 14 is configured to include an L2 (Level 2) cache which is a high speed memory to reduce the total time for access to a main memory 16 by temporarily storing a limited amount of code and data to be accessed frequently. The L2 cache generally consists of an SRAM (Static RAM) chip whose capacity is, for example, 512 kB or more.

The CPU 14 is interconnected with hardware components described below via three hierarchical buses: an FS (FrontSide) bus 18 which is a processor-connected bus directly connected to the CPU's external pins, a PCI (Peripheral Component Interconnect) bus 20 which is a bus for high speed I/O devices, and an ISA (Industry Standard Architecture) bus 22 which is a bus for low speed I/O devices.

The FSB 18 and the PCI bus 20 are generally coupled to each other through a CPU bridge (host-PCI bridge) 24 called a memory/PCI control chip. The CPU bridge 24 according to the present embodiment is configured to include a memory controller function which controls the access to the main memory 16 and a data buffer which compensates for a difference in data transfer rate between the FSB 18 and the PCI bus 20 and it may be, for example, 440BX manufactured by Intel.

The main memory 16 is a writable memory used as an area into which executable programs for the CPU 14 are loaded or data processed by these executable programs are written. The main memory 16 generally consists of a plurality of DRAM (Dynamic RAM) chips and it usually has a storage capacity of, for example, 32 MB but it can be extended to 256 MB. For recent years, to meet the need for much faster storage, the conventional DRAMs have been replaced by high speed page DRAMs, EDO DRAMs, synchronous DRAMs (SDRAMs), burst EDO DRAMs, or RDRAMs.

The executable programs referred to hereinabove include OSs such as Windows 98, various device drivers for operating peripheral equipment on a hardware basis, application programs adapted to specific applications, and firmwares such as BIOS (Basic Input/Output System: programs for controlling the input/output operations for a keyboard, floppy disk drive, or any other hardware component) stored in a flash ROM 72.

The PCI bus 20 is a bus which allows for relatively high speed data transmission (with, for example, a bus width of 32/64 bit, a maximum operating frequency of 33/66/100 MHz, and a maximum data transfer rate of 132/264 MBps) and PCI devices which can operate at a relatively high speed such as a card bus controller 30 are connected to it. The PCI architecture has been initially proposed by Intel to implement so called PnP (plug-and-play) function.

Figure 2:
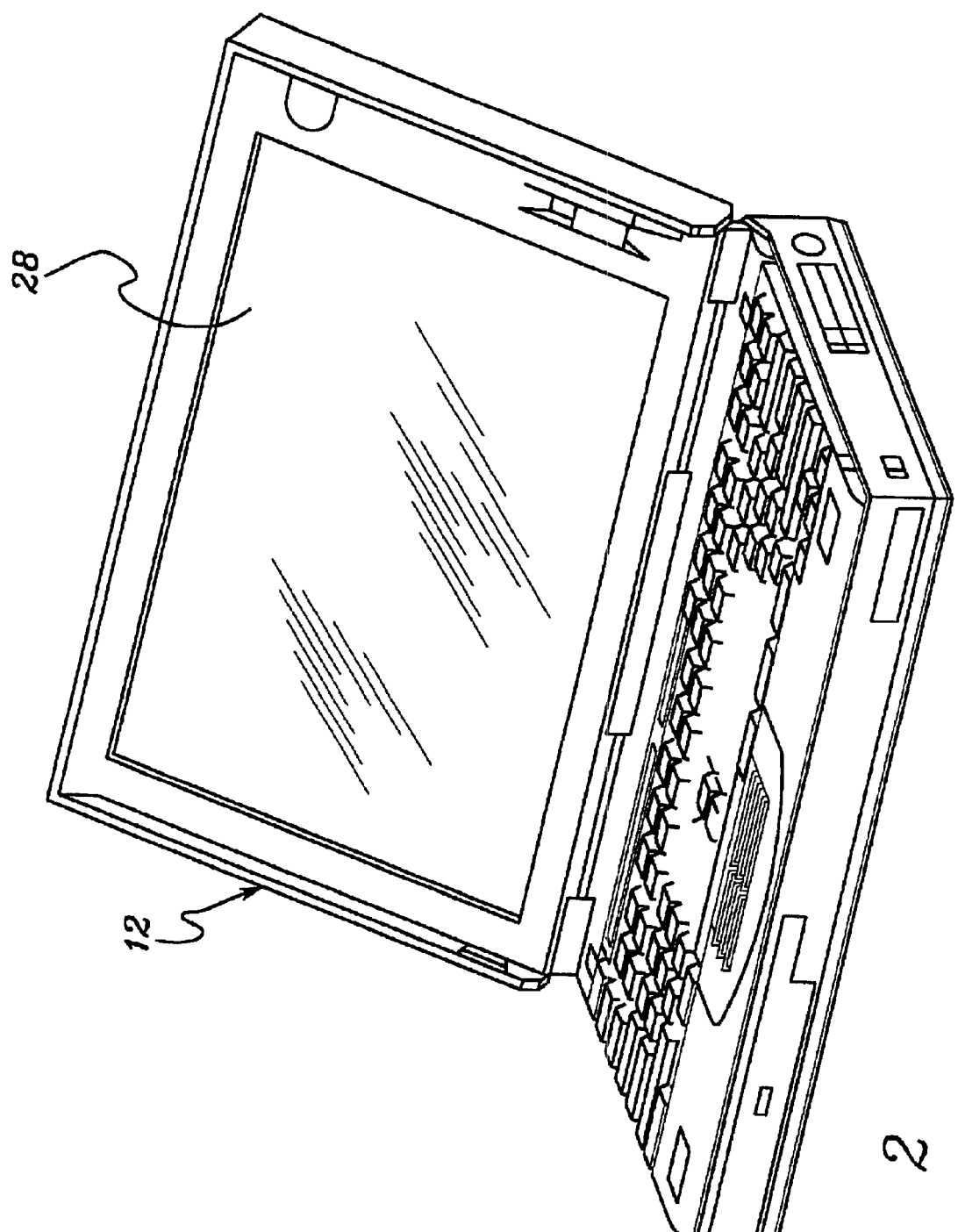
FIG. 2 is a perspective view for showing the appearance of a notebook PC.

A video subsystem 26 is a subsystem to implement video-related functions and includes a video controller configured as an IC to actually process a draw instruction from the CPU 14 and to write processed drawing information into a video memory (VRAM) as well as to read out the drawing information from the VRAM for displaying it as output drawing data on a liquid crystal display (LCD) 28 (see FIG. 2). The video controller can convert a digital video signal into an analog video signal through a digital-to-analog converter (DAC) provided therewith. The converted analog video signal is provided to a CRT port (not shown) through a signal line.

A card bus controller 30, an audio subsystem 32, a docking station interface (dock I/F) 34, and a mini PCI slot 36 are connected to the PCI bus 20, respectively. The card bus controller 30 is a dedicated controller for connecting a bus signal for the PCI bus 20 to the interface connector (card bus) of a PCI card bus slot 38. The card bus slot 38 is located, for example, on the wall of the PC body 12 to be loaded with a PC card 40 which is conformable to the specification (for example, "PC Card Standard 95") established by the PCMCIA/JEIDA (Personal Computer Memory Association/Japan Electronic Industry Development Association).

The dock I/F 34 is a hardware component to connect the PC 12 to a docking station (not shown) and when the PC 12 is installed on the docking station, the internal bus of the docking station is connected to the dock I/F 34 and various hardware components connected to the internal bus of the docking station are connected to the PCI bus 20 via the dock I/F 34. A network adapter 42 is also connected to the mini PCI slot 36 to connect, for example, the computer system 10 to a network (for example, LAN).

The PCI bus 20 and the ISA bus 22 are interconnected with each other through an I/O bridge 44. The I/O bridge 44 has a bridge function between the PCI bus 20 and the ISA bus 22, a DMA controller function, a programmable interrupt controller (PIC) function, a programmable interval timer (PIT) function, an IDE (Integrated Drive Electronics) interface function, a USB (Universal Serial Bus) function, and an SMB (System Management BUS) interface function and contains a real time clock (RTC). To implement this I/O bridge, for example, a device (core chip) called PIIX4 manufactured by Intel can be used.

The DMA controller function is a function to perform data transfer between any peripheral equipment (for example, an FDD) and the main memory 16 without intervention of the CPU 14. The PIC function is a function to cause a predetermined program (interrupt handler) to execute in response to an interrupt request (IRQ) from any peripheral equipment. The PIT function is a function to generate timer signals at predetermined intervals, which are programmable.

The IDE interface implemented by the IDE interface function has an IDE hard disk drive (HDD) 46 connected therewith and also an IDE CD-ROM drive 48 connected therewith through ATAPI (At Attachment Packet Interface) technology. Instead of the IDE CD-ROM drive 48, a DVD (Digital Video Disk or Digital Versatile Disc) drive or any other IDE device may be connected. The external storages such as the HDD 46 and the CD-ROM drive 48 are placed, for example, in their appropriate locations called "media bay" or "device bay" in the PC body 12. These standard external storages may be interchangeably and exclusively installed together with other equipment such as an FDD or battery pack.

The I/O bridge 44 is provided with a USB port, which is connected to a USB connector 50 provided, for example, on the wall of the PC body 12. The USB technology supports a function to connect or disconnect new peripheral equipment (USB device) with its power on (hot plugging function) and a function to automatically recognize such newly connected peripheral equipment and reestablish the system configuration (plug-and-play function). Up to 63 USB devices can be daisy-chained to a single USB port. Exemplary USB devices include a keyboard, a mouse, a joystick, a scanner, a printer, a modem, a display monitor, and a tablet.

In addition, an EEPROM 94 is connected to the I/O bridge 44 via the SM bus. The EEPROM 94 is a memory to hold information such as a user-specified password, a supervisor password, and a product serial number and it is non-volatile and electrically rewritable.

The I/O bridge 44 is connected to a power section 54. The power section 54 comprises a power circuit 66 configured to include an AC adapter 62, a battery 64, and a charger for charging the battery 64 and also to generate direct-current constant voltages of 5 V, 3.3 V, and 12 V used for the computer system 10 and to perform the switching operation for starting/stopping the supply of such direct-current voltages to various sections of the computer system 10.

Within the core chip constituting the I/O bridge 44, an internal register to manage the power condition of the computer system 10 and a logic (state machine) to manage the power condition of the computer system 10 including the operation of the internal register are provided.

The logic sends various signals to or receives them from the power section 54 and, by sending or receiving these signals, recognizes the actual condition of power supply from the power section 54 to the computer system 10 to control the power supply to the computer system 10 according to an instruction from the logic.

The ISA bus 22 is a bus having a lower data transfer rate than that of the PCI bus 20 (for example, a bus width of 16 bits and a maximum data transfer rate of 4 MBps) and it is used to connect a super I/O controller 70, a flash ROM 72 consisting of an EEPROM, a CMOS 74, an embedded controller 80 which is connected to a gate array logic 76 and to a fan 82 provided to inhibit the temperature of the CPU 14 from rising excessively, and other peripheral equipment (not shown) which operates at a relatively low speed such as a keyboard/mouse controller.

An I/O port 78 is connected to the super I/O controller 70. The super I/O controller 70 controls the operation of the floppy disk drive (FDD), the input/output of parallel data via a parallel port (PIO), and the input/output of serial data via a serial port (SIO).

The flash ROM 72 is a memory to hold BIOS and other programs and it is non-volatile and electrically rewritable. The CMOS 74 is configured as having a volatile semiconductor memory connected to a backup power supply and it is a non-volatile and high speed storage means.

Some storage areas of the CMOS 74 are used to store error information detected during the power-on operation of the computer system 10 in connection with the initialization of the IC (hereinafter referred to as "error history area").

Figure 3:
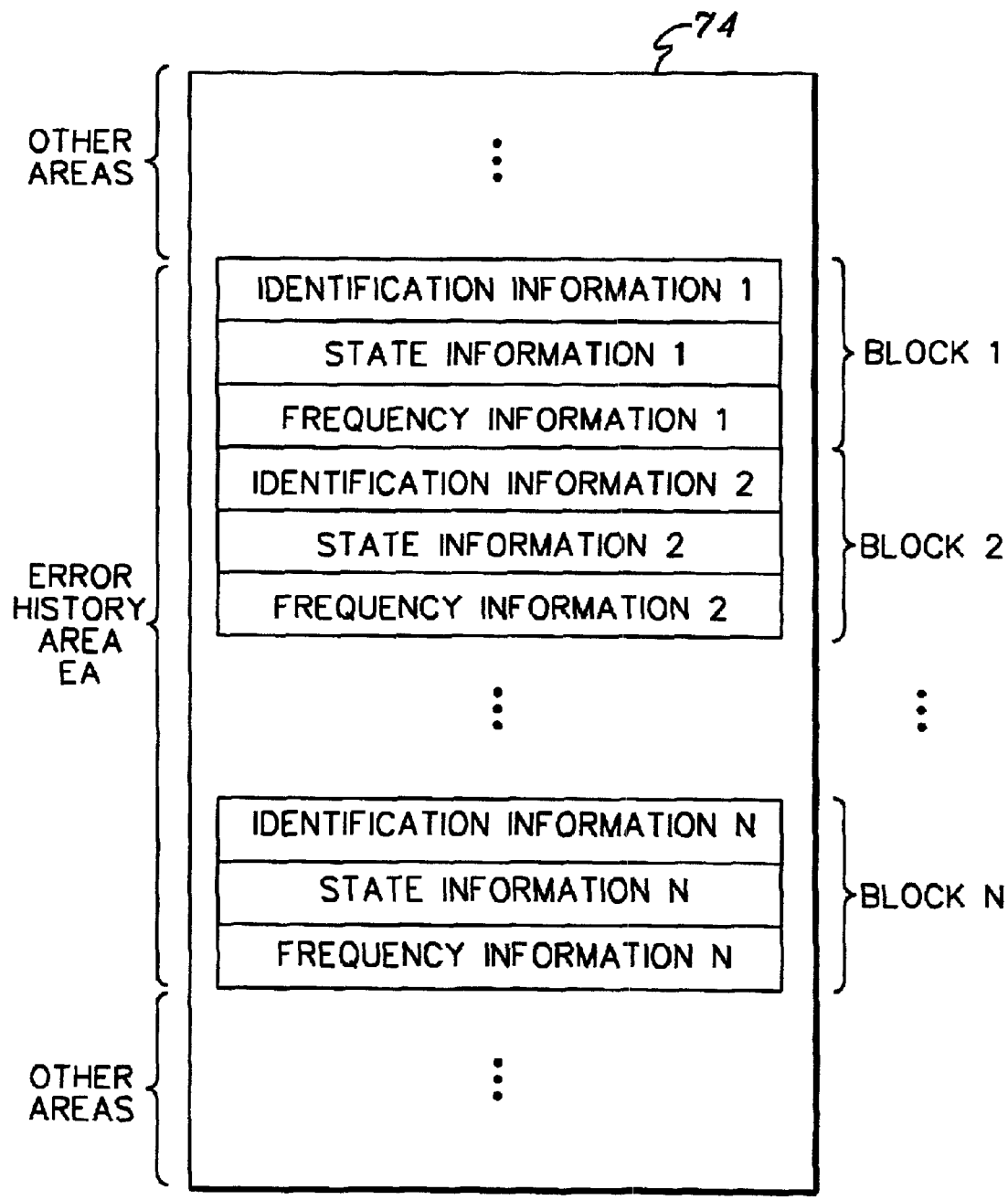
FIG. 3 is a schematic diagram for showing the configuration of an error history area in a CMOS according to an embodiment of the present invention.

FIG. 3 shows the configuration of an error history area EA in the CMOS 74. The error history area EA according to the present embodiment is configured to store, as a block, three types of information, that is, "identification information," "state information," and "frequency information" for each of a plurality of errors which are previously defined as errors in connection with the initialization of the IC (for example, a read/write error of a register contained in the video controller and a read/write error of a register contained in the gate array logic 76). The "identification information" is numeric information previously allocated to each of the plurality of errors and it has been stored at the beginning of each block in the error history area EA. The "state information" indicates a detected error condition and the "frequency information" indicates the frequency of repeated occurrence of the detected error, and both the "state information" and the "frequency information" are stored in a block which contains the identification information corresponding to the detected error.

The embedded controller 80 controls a keyboard (not shown) and at the same time, cooperates with the gate array logic 76 to provide power management and thermal management. The fan 82 is rotationally operated to cool the CPU 14 by the thermal function of the embedded controller 80 when the temperature in the vicinity of the CPU 14 is sensed by a thermistor (provided in the vicinity of the CPU 14 and also not shown) to be equal to or higher than, a predetermined value. The fan 82 is configured to start/stop its rotational operation through the embedded controller 80 under control of the CPU 14.

Figure 4:
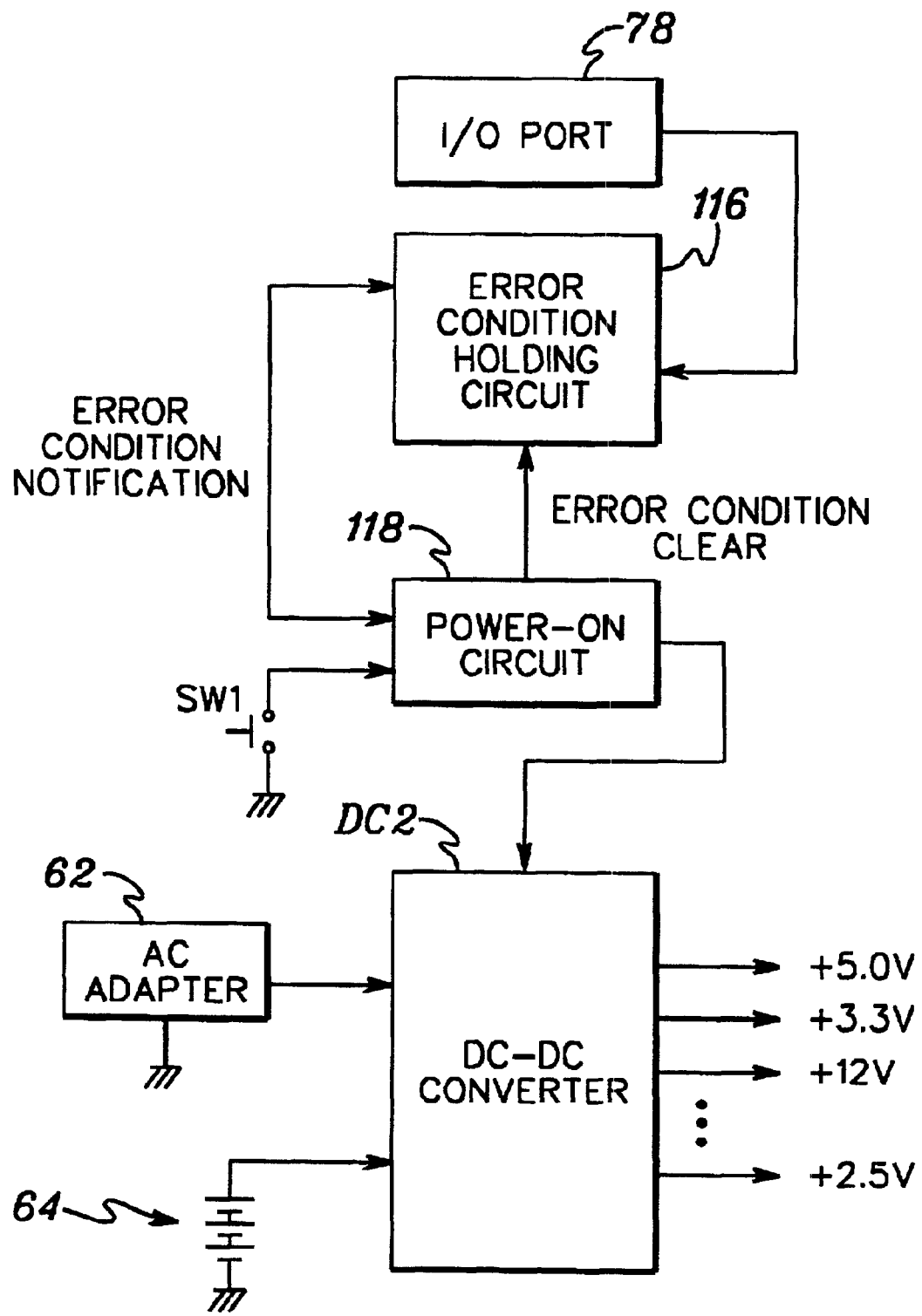
FIG. 4 is a functional block diagram for showing the power control section of a power circuit according to an embodiment of the present invention.

FIG. 4 shows a functional block diagram of the power control section in the power circuit 66 of the computer system 10 according to the present embodiment. As shown in the figure, the power control section in the power circuit 66 according to the present embodiment is provided with an error condition holding circuit 116 to hold an error condition detected during the power-on operation in connection with the initialization of the IC and a power-on circuit 118 to receive the error condition notification from the error condition holding circuit 116.

In this power control section, when a power switch SW1 is depressed, the power-on circuit 118 operates to start up a DC-DC converter DC2. Then the DC-DC converter DC2 generates direct-current voltages of +5 V, +3.3 V, and +12 V for the internal circuit of the computer system 10 from a direct-current voltage supplied by the AC adapter 62 or the battery 64.

When the DC-DC converter DC2 starts and the internal circuit is fed with power, the POST is carried out to perform self-diagnosis on hardware components after the initialization and various setup operations for the computer system 10 have been completed. The OS will be loaded normally if there is no error detected through this self-diagnosis, while the error condition holding circuit 116 will hold a condition which indicates that there is an error if any error is detected. It should be appreciated that the error condition holding circuit 116 according to the present embodiment comprises a D-type flip-flop and such a condition which indicates that there is an error can be held by keeping the Q output terminal of the D-type flip-flop at low level.

When the error condition holding circuit 116 goes in the state which indicates that there is an error, the power-on circuit 118 disables the DC-DC converter DC2 to provide the output (which is equivalent to depressing the power switch SW1 to turn the power off) and then enables the DC-DC converter DC2 to provide the output (which is equivalent to depressing the power switch SW1 to turn the power on) after a predetermined period of time (a few seconds in the present embodiment). At the same time, the power-on circuit 118 clears the condition held in the error condition holding circuit 116. By performing these operations, the computer system 10 can be automatically restarted when there is any hardware error detected. It should be appreciated that the power-on circuit 118 and the DC-DC converter DC2 are equivalent to the control means and the power unit according to the present invention, respectively.

Now, the specific configuration of the power circuit 66 according to the present embodiment will be described below with reference to FIG. 5. As shown in the figure, the power circuit 66 includes a subregulator 100, a power-on switch circuit 102, a power-on circuit 104, a power-off circuit 106, an auto power-off circuit 108, an auto power-on circuit 110, a main regulator 112, a level shift circuit 114, and the error condition holding circuit 116.

The subregulator 100 comprises a DC-DC converter DC1 to which the AC adapter 62 and the battery 64 are connected via a diode D1 and a diode D2, respectively. The DC-DC converter DC1 converts the power supplied by the AC adapter 62 or the battery 64 into a direct-current voltage of +5 V for output. Since the DC-DC converter DC1 is always operative, the subregulator 100 continuously supplies the direct-current voltage of +5 V to various components of the power circuit 66 and other portions as necessary. The diodes D1 and D2 serve to prevent any short circuit between the AC adapter 62 and the battery 64.

The power-on switch circuit 102 comprises a power switch SW1 with one terminal connected to the output terminal of the DC-DC converter DC1 through a resistor and the other connected to the ground. The power switch SW1 is a "momentary-type" switch which makes the circuit (ON state) while it is depressed by the user and breaks the circuit (OFF state) when the user releases it.

The power-on circuit 104 comprises a transistor TR1, and its emitter is connected to a terminal of the resistor provided in the power-on switch 102 which is connected to the output terminal of the DC-DC converter DC1 and its base is connected to one terminal of the power switch SW1 through a diode, a capacitor C1, and a resistor R2. The emitter and the base of the transistor TR1 are connected to each other through a resistor R1 and the collector of the transistor TR1 is connected to the first pin of a three-input AND gate AND through a diode.

The power-off circuit 106 comprises a controller CTL with an input terminal IN connected to one terminal of the power switch SW1 through a diode and an output terminal OUT connected to the second pin of the AND gate AND. It should be appreciated that the output terminal OUT of the controller CTL is connected to the output terminal of the DC-DC converter DC1 through a resistor and it is always kept at high level. It should further be appreciated that the +5 V direct-current voltage is applied to the controller CTL as its own power but this voltage is applied only while the computer system 10 is operating, that is, the controller CTL is adapted to operate only while the computer system 10 is operating. Therefore, while the computer system 10 is operating, the controller CTL keeps the output terminal OUT at high level and continuously monitors the depression of the power switch SW1. The controller CTL determines whether the computer system 10 may be shut down when the power switch SW1 is depressed. If the computer system 10 may be shut down, the controller CTL shifts the output terminal OUT to low level.

The auto power-off circuit 108 comprises two transistors TR2 and TR3. The base of the transistor TR2 is connected to the Q output terminal of the D-type flip-flop FF described below through a resistor R4, a capacitor C2, and a diode, and the emitter is connected to the output terminal of the DC-DC converter DC1 to continuously receive the +5 V direct-current voltage and to its own base through a resistor R3, and the collector is connected to the base of the transistor TR3 through a resistor. The emitter of the transistor TR3 is grounded and connected to its own base through a resistor, and the collector is connected to the output terminal of the DC-DC converter DC1 through a resistor to continuously receive the +5 V direct-current voltage and to the third pin of the AND gate AND.

The auto power-on circuit 110 comprises an inverter INV and an integrating circuit which consists of a resistor R5 and an electrolytic capacitor C6. The input terminal of the inverter INV is connected to the Q output terminal of the D-type flip-flop FF and the output terminal of the inverter INV is connected to one terminal of the resistor R5. The other terminal of the resistor R5 is connected to one terminal of the grounded electrolytic capacitor C6 and to the first pin of the AND gate AND through a diode.

The main regulator 112 comprises a DC-DC converter DC2. The DC-DC converter DC2 is configured to receive the direct-current voltage from the AC adapter 62 or the battery 64 (the wiring for supplying that voltage is not shown) and to supply through the output terminal OUT a direct-current voltage of +5 V, +3.3 V, or +12 V to various components of the computer system 10 as necessary when the input terminal IN is at high level.

The level shift circuit 114 comprising two transistors serves to produce a direct-current voltage of +5 V when a voltage within a predetermined range is applied to it. It should be appreciated that the base of one of the two transistors is connected to the output terminal OUT of the DC-DC converter DC2 through a resistor, the emitter is grounded and connected to its own base through a resistor, and the collector is connected to the base of the other transistor through a resistor. It should further be appreciated that the emitter of the other transistor is connected to the output terminal of the DC-DC converter DC1 to continuously receive the +5 V direct-current voltage and to its own base through a resistor and the collector is connected to the first pin of the AND gate AND through a diode.

The error condition holding circuit 116 comprises a D-type flip-flop FF. The input terminal of the D-type flip-flop FF is connected to bit 0 of the I/O port 78 and the clock (CK) input terminal is grounded through a resistor and connected to bit 1 of the I/O port 78. The preset (PR) input terminal and the clear (CLR) input terminal of the D-type flip-flop FF are connected to the output terminal of the DC-DC converter DC1 through a resistor and the power supply terminal VCC is connected directly to the output terminal of the DC-DC converter DC1 to continuously receive the +5 V direct-current voltage. In addition, the Q output terminal of the D-type flip-flop FF is connected to bit 2 of the I/O port 78. Bit 0 and bit 1 of the I/O port 78 cooperate to function as an output port and bit 2 functions as an input port.

By shifting the CK input terminal from low level to high level through bit 1 of the I/O port 78, the D-type flip-flop FF receives a signal at the D input terminal through bit 0 of the I/O port 78 and then provides it as output through the Q output terminal. The output signal from the Q output terminal of the D-type flip-flop FF can be read out through bit 2 of the I/O port 78.

When the power is turned off at this point, the Q output terminal of the D-type flip-flop FF remains unchanged because bit 1 of the I/O port 78 goes into low level but does not shift from low level to high level. Therefore, the content of the D-type flip-flop can be held even while the power is turned off.

The DC-DC converter DC1 and the DC-DC converter DC2 of the power circuit 66 according to the present embodiment are implemented by a switching power circuit (so called chopper regulator), which is configured to selectively use one of the two types of PWM (Pulse Width Modulation), one using a switching signal (pulse signal) which varies the frequency according to the load current and the other using a switching signal which varies the pulse width (duty) at a fixed frequency independently of the magnitude of the load current, in order to control to turn on/off a switching element contained in the switching power circuit. It should be appreciated that the PWM type using a switching signal which varies the frequency can provide a higher conversion efficiency and lower stability than the other PWM type using a switching signal at a fixed frequency. Therefore, in the present embodiment, the former PWM type using a switching signal which varies the frequency is used for normal operation and it can be switched to the latter PWM type using a switching signal at a fixed frequency, if necessary.

The power-on switch circuit 102, the power-on circuit 104, the auto power-off circuit 108, and the auto power-on circuit 110 cooperate together to provide the power-on circuit 118 shown in FIG. 4.

It should be appreciated that many electric circuits other than those shown in FIG. 1 are required to configure the computer system 10. These circuits will not be further described herein, because they are well known to those skilled in the art and are not essential to the present invention. It should also be appreciated that only some of the connections between hardware blocks are shown in the drawings in order to avoid complexity.

Figure 6:
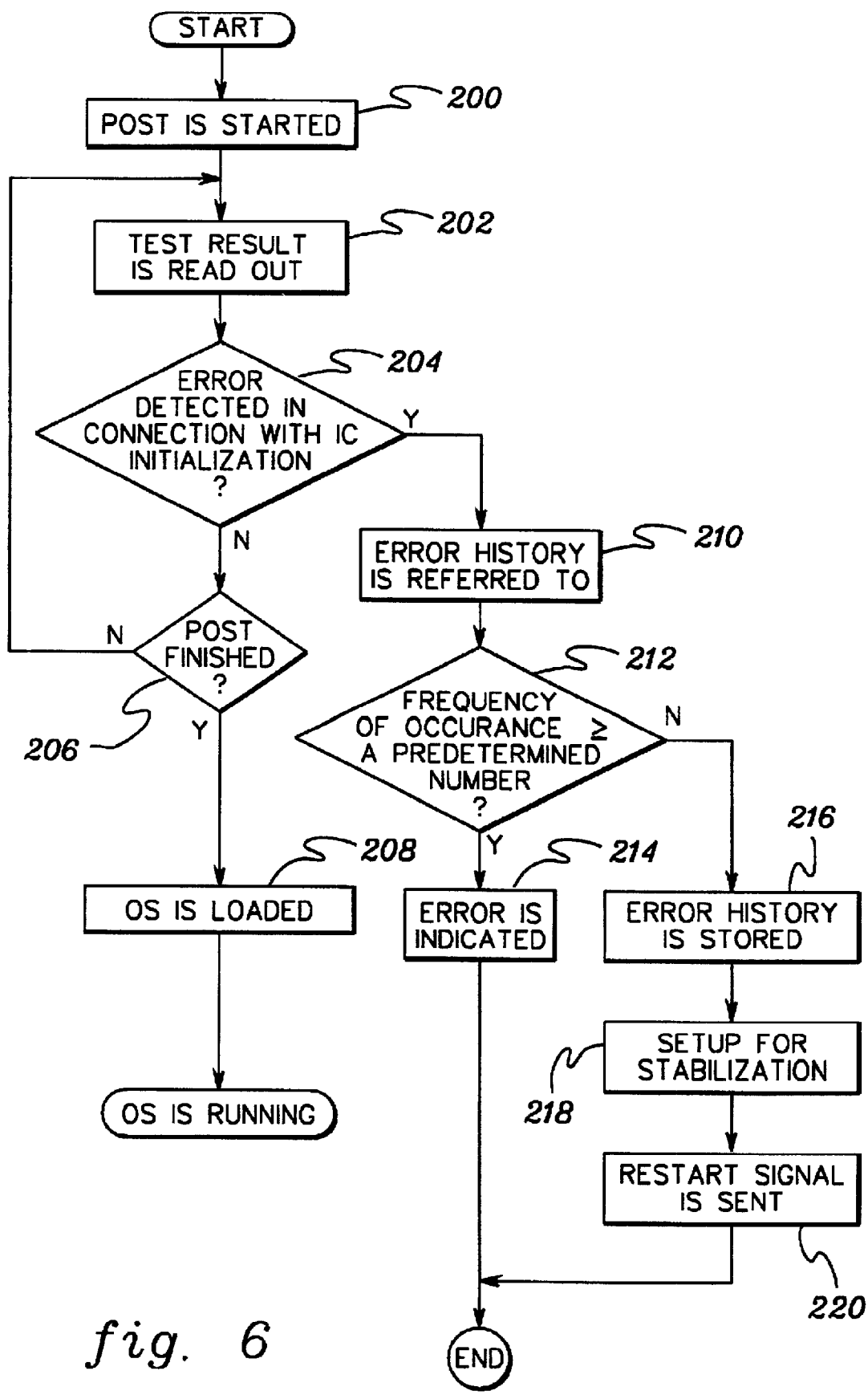
FIG. 6 is a flowchart for showing the flow of operations performed when the power switch is turned on in a computer system according to an embodiment of the present invention.

Now, to explain the operation of the present embodiment, the operations performed when the power switch SW1 of the computer system 10 is turned on will be described below with reference to the flowchart shown in FIG. 6.

When the power switch SW1 is turned on, a portion of the storage area of the flash ROM 72 where the POST program, a portion of the BIOS, has been stored is accessed and then the POST program is executed (step 200). This allows the main memory 16 to be initialized (that is, its content to be cleared) followed by the initialization of the hardware environment for the computer system 10 (specifically, the interrupt vectors for external hardware components are initialized, the external hardware components are initialized, and software interrupt vectors are initialized) and then each hardware component of the computer system 10 is tested. The test results for these hardware components are stored in a predetermined area of the CMOS 74.

In step 202, the POST test results for the hardware components are read out from the predetermined area of the CMOS 74 and in step 204, a determination is made whether any test result indicates that there is an error detected in connection with the initialization of the IC. If there is no error detected (negative determination), the process proceeds to step 206 to determine whether the POST program has finished. If the program has not finished (negative determination), the process returns to step 202 and at the point when the program has finished (when a positive determination is made), the process proceeds to step 208.

In step 208, the OS is loaded into the main memory 16 for execution. This allows the OS to be running on the computer system 10. It should be appreciated that the OS has previously been stored on the HDD 46 and it is loaded from the HDD 46 at step 208.

On the other hand, if it is determined in step 204 that any test result indicates that there is an error detected in connection with the initialization of the IC (positive determination), the process proceeds to step 210 where the error history in connection with the initialization of the IC is referred to by reading out the content in the error history area EA of the CMOS 74. In step 212, a determination is made, based on the frequency information contained in the error history area EA, whether the frequency of repeated occurrence of the error detected in step 204 is equal to or more than a predetermined number of times (once in the present embodiment). If it is determined that the frequency equal to or more than the predetermined number (positive determination), the process proceeds to step 214 where an error message that the error has occurred as frequently as or more frequently than the predetermined number of times is indicated on the LCD 28 and then the process ends. It should be appreciated that the predetermined number of times has previously been established according to the present embodiment but it may be specified by the user through a keyboard or the like.

If it is determined in step 212 that the frequency of repeated occurrence of the error detected in step 204 does not exceed the predetermined number of times (negative determination), the process proceeds to step 216 where the error condition is stored as state information in the block containing the identification information corresponding to the error detected in step 204 and the frequency of occurrence ("1" in the present embodiment) is stored as frequency information.

In step 218, a setup for stabilizing the hardware operation is made. It should be appreciated that as a setup for stabilizing the operation of the DC-DC converters DC1 and DC2 in the power circuit 66, the PWM type using a switching signal at a fixed frequency is adopted to provide a switching signal for the DC-DC converters DC1 and DC2. At the same time, the embedded controller 80 is set up to rotate the fan 82 and to disable the power management function.

In step 220, a signal RS to restart the computer system 10 (hereinafter referred to as "restart signal") by stopping the power supply from the power circuit 66 and then turning on the power again after a predetermined period of time is provided through the Q output terminal of the D-type flip-flop FF and subsequently, the process ends. It should be appreciated that in the present embodiment, the restart signal RS is at high level for normal operation and it is controlled to shift to low level to restart the computer system 10 as descried in step 220. This control to restart the computer system 10 can be accomplished by shifting bit 1 of the I/O port 78 from low level to high level after bit 0 is set at low level. It should be appreciated that the process in step 202 described above is equivalent to the readout means according to the present invention.

Now, the operation of the power circuit 66 will be described below with reference to FIG. 5. Firstly, how the power circuit operates when there is no error detected in connection with the initialization of the IC during the normal startup operation caused by depressing the power switch SW1, that is, the operation described above with reference to FIG. 6 will be described below.

When the power switch SW1 is depressed by the user (the power switch SW1 is closed), the signal line in the power-on switch circuit 102 which continuously receives the +5 V direct-current voltage is grounded to shift the base of the transistor TR1 in the power-on circuit 104 to ground level and then the transistor TR1 is turned on. Since the +5 V direct-current voltage is applied to the first pin of the AND gate AND through the transistor TR1, the first pin of the AND gate AND shifts to high level.

On the contrary, at this point, the output terminal OUT of the controller CTL is at high level and therefore, the second pin of the AND gate AND is at high level. Since at the same time, the restart signal RS is at high level and the transistors TR2 and TR3 in the auto power-off circuit 108 are both turned off, the third pin of the AND gate AND is also at high level. Therefore, since all the three input pins of the AND gate AND are at high level, the output terminal of the AND gate AND goes into high level and the input terminal IN of the DC-DC converter DC2 also goes into high level to allow the DC-DC converter DC2 to provide a predetermined direct-current voltage (+5 V, +3.3 V, +12 V, and the like).

Since the power switch SW1 is a momentary-type switch, it is only a moment (the length depends on a time constant which is determined by the capacitance value of the capacitor C1 and the resistance value of the resistor R2 in the power-on circuit 104) while the first pin of the AND gate AND is kept at high level due to the operation of the power-on switch circuit 102 and the power-on circuit 104. During such a momentary period, the DC-DC converter DC2 provides the direct-current voltage as output, which allows the two transistors in the level shift circuit 114 to be turned on and the level shift circuit 114 to apply the +5 V direct-current voltage to the first pin of the AND gate AND, thereby keeping that pin at high level. Therefore, since the three input pins of the AND gate AND are kept at high level, the DC-DC converter DC2 can continue to operate.

Now, the normal power-off operation caused by depressing the power switch SW1 will be described below. At this point, the +5 V direct-current voltage is applied to the power supply terminal of the controller CTL in the power-off circuit 106 and the controller CTL is kept operative. Therefore, when the power switch SW1 is depressed by the user, the controller CTL detects such a depression of the power switch SW1 and determines whether the computer system 10 may be shut down. If the computer system 10 may be shut down, the controller CTL shifts the output terminal OUT to low level. This determination whether the computer system 10 may be shut down is accomplished, for example, to avoid possible problems that some of data being written onto the HDD 46 may be lost or the recording medium in the HDD 46 may be broken when the power is turned off abruptly during the data write operation.

When the output terminal OUT of the controller CTL shifts to low level, the second pin of the AND gate AND shifts to low level and the output terminal of the AND gate AND also shifts to low level with the input terminal IN of the DC-DC converter DC2 at low level and then the power supply from the DC-DC converter DC2 is stopped.

Now, how the power circuit operates when there is any error detected in connection with the initialization of the IC during the operation described above with reference to FIG. 6 will be described below. In this case, as described above, the restart signal RS provided by the Q output terminal of the D-type flip-flop FF is kept at low level. It should be appreciated that the D-type flip-flop FF is configured to continuously receive the +5 V direct-current voltage so that it can continue to provide outputs even when the power is turned off. When the restart signal RS shifts to low level, the transistors TR2 and TR3 of the auto power-off circuit 108 are both turned on and the +5 V direct-current voltage which is continuously applied to the collector of the transistor TR3 falls into ground and thus the third pin of the AND gate AND shifts to low level. Therefore, since the output terminal of the AND gate AND shifts to low level with the input terminal IN of the DC-DC converter DC2 at low level, the power supply from the DC-DC converter DC2 is stopped.

After a period of time whose length depends on a time constant which is determined by the capacitance value of the capacitor C2 and the resistance value of the resistor R4 in the auto power-off circuit 108, the transistor TR2 is turned off, thereby turning off the transistor TR3 and automatically shifting the third pin of the AND gate AND to high level. On the contrary, when the restart signal RS from the D-type flip-flop FF shifts to low level, that signal is turned into high level by passing through the inverter INV of the auto power-on circuit 110 and after a period of time whose length depends on a time constant which is determined by the resistance value of the resistor R5 and the capacitance value of the electrolytic capacitor C6, the first pin of the AND gate AND shifts to high level. Therefore, the output terminal of the AND gate AND shifts to high level with the input terminal IN of the DC-DC converter DC2 in the main regulator 112 at high level and thus, the power supply from the DC-DC converter DC2 can be automatically resumed at the predetermined voltage described above.

From the foregoing, with the method for controlling power of a computer, the power control apparatus, and the computer according to this embodiment, when there is any error detected through the POST in connection with the initialization of the IC, the power supply to the computer load is stopped and then the power is turned on again for restart of the computer. Thus, the computer will start up normally if there arises no error in connection with the initialization of the IC during the restart operation, thereby preventing the user from being aware of the occurrence of any problem detected through the POST and from feeling uneasy unnecessarily.

In addition, with the method for controlling power of a computer, the power control apparatus, and the computer according to this embodiment, when there is any error detected through the POST in connection with the initialization of the IC, a setup for stabilizing the operation of any hardware component contained in the computer can be selected. This may make the hardware operation stabler than that for the initial power-on operation when the computer is turned on again, thereby inhibiting the power-on problem from occurring again.

In addition, with the method for controlling power of a computer, the power control apparatus, and the computer according to this embodiment, the computer is inhibited to restart when any error in connection with the initialization of the IC occurs as frequently as or more frequently than a predetermined number of times (twice in this embodiment). This may avoid the problem that the restart operation is repeated and the computer will never eventually start up.

Furthermore, with the method for controlling power of a computer, the power control apparatus, and the computer according to this embodiment, an indication that the identical error arises repeatedly is displayed on the LCD 28. This may allow the user to be aware that such a problem arises that cannot be avoided by the restart operation.

It should be appreciated that in the present embodiment, identification information, state information, and frequency information are stored as error history as shown in FIG. 3. However, the present invention is not limited to this embodiment and, for example, only identification information and frequency information may be stored. In the latter case, the storage capacity required to store the error history can be reduced compared to this embodiment and thus, a device implementing the present invention can be manufactured at a lower cost.

Figure 5:
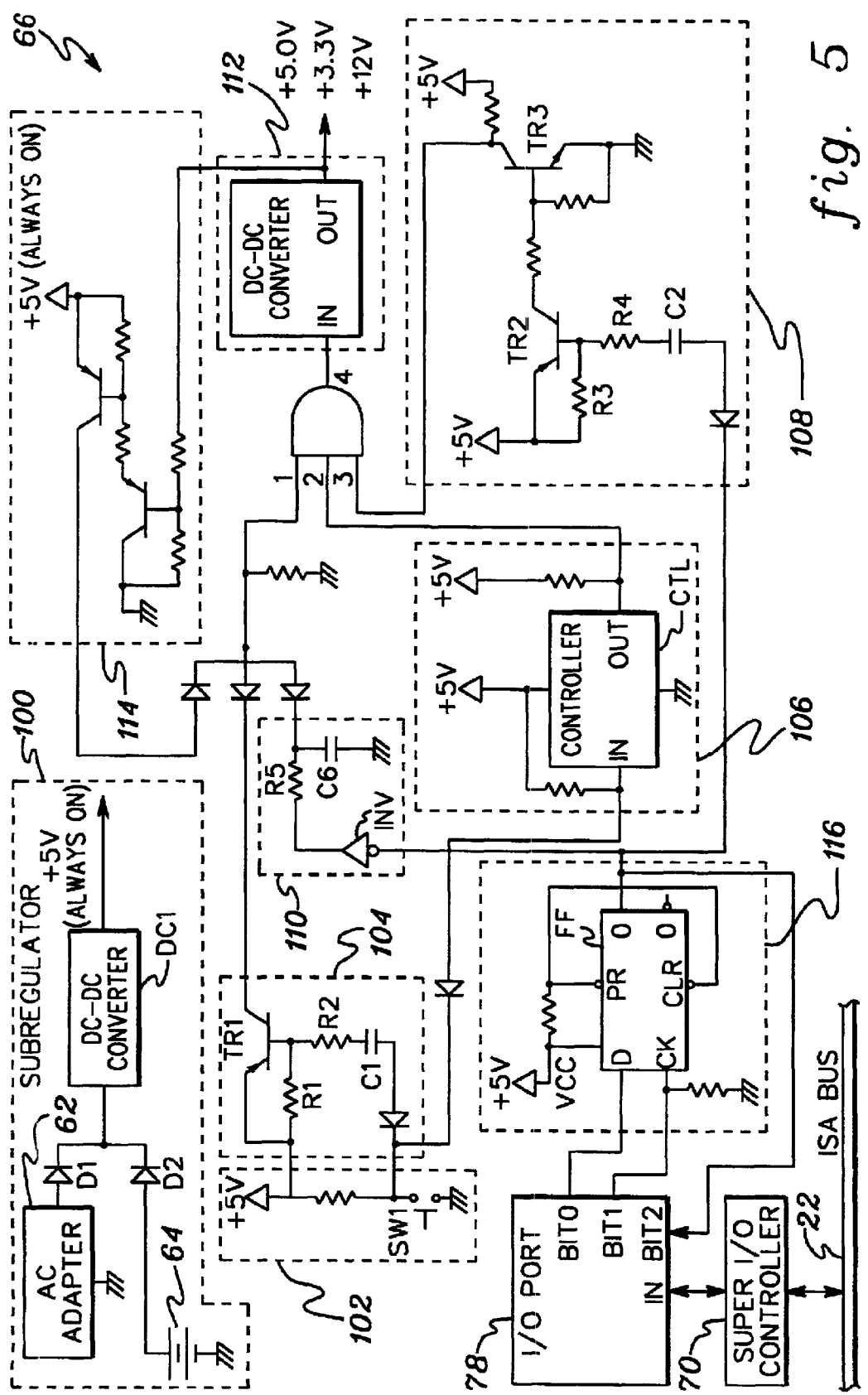
FIG. 5 is a circuit diagram (including a partial block diagram) for showing the configuration of a power circuit according to an embodiment of the present invention.

It should also be appreciated that in the present embodiment, the power control apparatus is configured to comprise the auto power-off circuit 108 and the auto power-on circuit 110 as shown in FIG. 5. However, the present invention is not limited to this embodiment and, for example, the power control apparatus may be implemented by a circuit which shifts any one of the input pins of the AND gate AND to low level when the restart signal RS at low level is provided by the D-type flip-flop FF and then shifts the same pin to high level after the timer notifies of the elapse of a predetermined period of time.

It should also be appreciated that in the present embodiment, the error history is stored in the CMOS 74. However, the present invention is not limited to this embodiment and, for example, the error history may be stored in storage means, for example, the EEPROM 94 which can hold the content when the power is turned off.

It should be further appreciated that in the present embodiment, the power circuit 66 consists of discrete parts. However, the present invention is not limited to this embodiment and, for example, the power-on circuit 104, the power-off circuit 106, and the auto power-off circuit 108 may be integrated into a single IC. In this case, the power circuit 66 will be able to occupy a smaller space and to operate more stably.

As described above in detail, in the method for controlling power of a computer and the power control apparatus according to the present invention, when the self test provides a predetermined test result, the power supply to the computer is stopped and then the power is turned on again. This will allow the computer to restart and if such a predetermined test result is not provided during the restart operation, the computer will restart normally. Therefore, the present invention has excellent advantages that the user will not be aware of the occurrence of a problem detected through the self test, which can prevent the user from feeling uneasy unnecessarily.

In addition, with the computer according to the present invention, when the self test provides a predetermined test result, the power supply to the computer is stopped and then the computer is turned on again for restart. Thus, the computer will start up normally if such a predetermined test result is not provided during the restart operation. Therefore, the present invention has excellent advantages that the user will not be aware of the occurrence of a problem detected through the self test, which can prevent the user from feeling uneasy unnecessarily.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What we claim is:

1. A method for controlling power of a computer in which at least a power-on self test for hardware is carried out before shifting into an operating system process, when the power is turned on, comprising:

obtaining a result of said power-on self test;

automatically turning on the power again a defined period of time after stopping the power supply to said computer when a predetermined test result of said power-on self test has been obtained;

wherein operation of a hardware component contained in said computer is stabilized when said predetermined test result has been obtained; and wherein stabilizing the operation of said hardware component comprises employing at least one of a setup for specifying a pulse width modulation type using a switching signal at a fixed frequency for the power supply and a setup for disabling a function to suppress power consumption.

2. The method according to claim 1, wherein said predetermined test result includes a test result indicating that the hardware component contained in said computer is not initialized correctly.

3. The method according to claim 1, wherein the power is inhibited to be turned on again after the power supply to said computer is stopped when said predetermined test result has been obtained predetermined number of times.

4. The method according to claim 1, wherein said automatically turning on occurs without making an operator of the computer aware of said result of said power-on self test.

5. A power control apparatus for controlling power of a computer in which at least a power-on self test for hardware is carried out before shifting into an operating system process, when the power is turned on, comprising:

a holding unit for obtaining a result of said power-on self test;

a control unit for automatically controlling turn on of power again a defined period of time after stopping the power supply to said computer when a predetermined test result of said power-on self test has been obtained by said holding unit;

wherein operation of a hardware component contained in said computer is stabilized when said predetermined test result has been obtained; and wherein stabilizing the operation of said hardware component comprises employing at least one of a setup for specifying a pulse width modulation type using a switching signal at a fixed frequency for the power supply and a setup for disabling a function to suppress power consumption.

6. The power control apparatus according to claim 5, wherein said predetermined test result includes a test result indicating that the hardware component contained in said computer is not initialized correctly.

7. The power control apparatus according to claim 5, wherein the automatically controlling turn on of power occurs without making an operator of the computer aware of said result of said power-on self test.

8. The power control apparatus according to claim 5, wherein said control unit inhibits the power to be turned on again after the power supply to said computer is stopped when said predetermined test result has been obtained a predetermined number of times.

9. A computer, comprising:

a power control apparatus for controlling power of said computer according to claim 8;

a power unit being controlled by said power control apparatus; and a computer load operating on the power supplied by said power unit.

10. A computer, comprising:

a power control apparatus for controlling power of said computer according to claim 5, a power unit being controlled by said power control apparatus; and a computer load operating on the power supplied by said power unit.

* * * * *